No. 753,936. PATENTED MAR. 8, 1904.
R. M. & G. T. TULL.
PUNCH.
APPLICATION FILED NOV. 11, 1903.
NO MODEL.
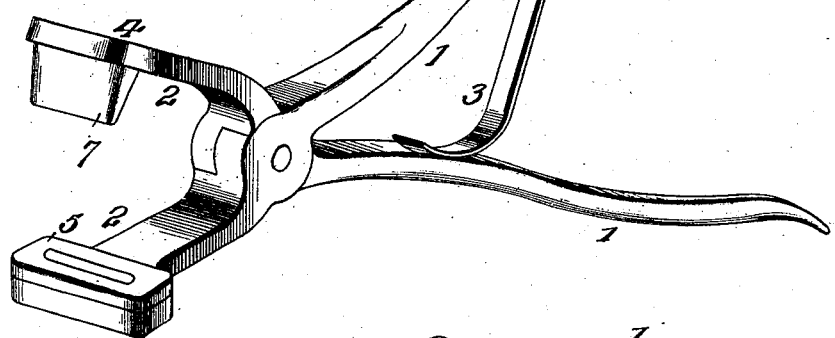
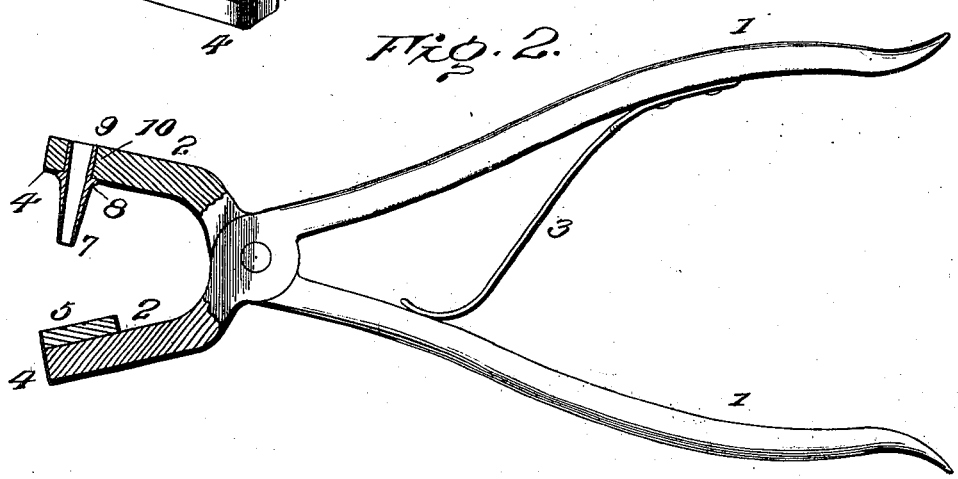
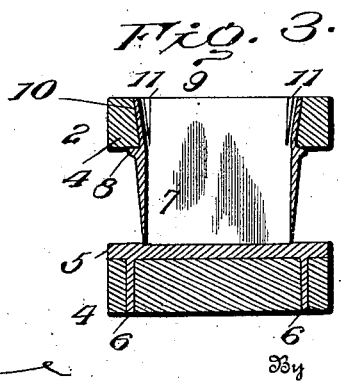
Inventors
R. M. Tull
G. T. Tull
Witnesses
By
Attorneys No. 753,936. Patented March 8, 1904.

UNITED STATES PATENT OFFICE.

ROBERT M. TULL AND GEORGE T. TULL, OF WINDSOR, ILLINOIS.

PUNCH.

SPECIFICATION forming part of Letters Patent No. 753,936, dated March 8, 1904.

Application filed November 11, 1903. Serial No. 180,761. (No model.)

*To all whom it may concern:*

Be it known that we, ROBERT M. TULL and GEORGE T. TULL, citizens of the United States, residing at Windsor, in the county of Shelby and State of Illinois, have invented certain new and useful Improvements in Punches, of which the following is a specification.

This invention relates to improvements in implements of that type especially adapted for punching leather or like material to provide buckle-tongue slots. In a further adaptation the implement is for use as a device for removing a piece of flesh from the noses of swine to prevent these animals from rooting.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of the implement embodied in the invention. Fig. 2 is a longitudinal sectional view through the implement. Fig. 3 is a transverse sectional view about centrally of the heads carried by the jaws thereof.

Corresponding and like parts are referred to in the following description and indicated in all the views of the drawings by the same reference characters.

The implement is of the plier type, and consists of the handles 1, with which the jaws 2 of the device are formed. The handle members of the device are pivoted adjacent the extremities of the jaws, and spring 3, disposed between the handles 1, serves to normally hold the said handles apart, as well as to normally space the jaws 2 from each other. Each of the jaws 2 is provided with a head 4, and one of the heads 4 has secured thereto a bed-plate 5, of soft metal, such as brass. The bed-plate is held upon the head by means of integral lugs 6, which are received in openings in the said jaw. The other jaw of the implement carries the punch or cutter 7, which is of tubular form to afford a clearing-space for the material which is being operated upon. The cutter 7 is provided with an annular shoulder 8, from which extends the tang 9, the latter being received in an opening 10 in the head 4 of the jaw which carries the cutter. The shoulder 8 limits the upward movement of the cutter, as will be readily comprehended.

The end portions of the tang 9 may be provided with vertical slits 11 to separate the same from the body of the tang or shank of the cutter, and these end portions constitute spring-engaging members which are adapted to hold the cutter within the opening 10 of the head 4. The opening 10 would be tapered, so as to admit of the spring action of the members formed by the slits 11. The upper extremities of the end portions of the tang are rounded, so that the same may be sprung so as to permit disengagement thereof and ready removal of the tang or cutter.

The operation of the implement is simple, since by forcing the handles together in the usual manner the cutter is forced into engagement with the bed-plate 5, effecting the necessary cutting action in this manner.

The device comprises a minimum number of parts and is consequently very cheap relative to the cost of manufacture, at the same time adapted for convenient use by harness-makers or otherwise.

Having thus described the invention, what is claimed as new is—

1. In an implement of the class described, the combination with complementary handle members, jaws carried by the said members, heads formed in the said jaws, one of the jaws being provided with an opening, and a tubular punch having spring-engaged portions secured within the opening of the aforesaid jaw.

2. In an implement of the class described, the combination with handle members, jaws having heads formed thereon, a bed-plate carried by the head of one of the jaws, the other jaw having its head provided with an opening therein, and a tubular punch provided with a tang or shank extended within the aforesaid opening of the jaw, said shank having spring-engaging portions removably holding same upon the jaw.

3. In an implement of the class described, the combination with pivotally-secured handles provided with jaws, heads formed upon the jaws, one of said heads being provided with a bed-plate, the other head having an opening therein, a tubular cutter, a tang formed upon the cutter and received by the opening in the head aforesaid, the said tang having its end portions provided with vertical slits to form spring-engaging members to removably secure the cutter to the jaw.

In testimony whereof we affix our signatures in presence of two witnesses.

ROBERT M. TULL. [L. S.]
GEORGE T. TULL. [L. S.]

Witnesses:
WALTER E. MILLER,
JESSE R. McVAY.